United States Patent
Kolter et al.

(10) Patent No.: US 12,271,159 B2
(45) Date of Patent: Apr. 8, 2025

(54) CONTROLLER WITH NEURAL NETWORK AND IMPROVED STABILITY

(71) Applicants: Robert Bosch GmbH, Stuttgart (DE); Carnegie Mellon University, Pittsburgh, PA (US)

(72) Inventors: Jeremy Zieg Kolter, Pittsburgh, PA (US); Melrose Roderick, Pittsburgh, PA (US); Priya L. Donti, Pittsburgh, PA (US); Julia Vinogradska, Stuttgart (DE)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 985 days.

(21) Appl. No.: 17/184,995

(22) Filed: Feb. 25, 2021

(65) Prior Publication Data

US 2021/0302921 A1    Sep. 30, 2021

(30) Foreign Application Priority Data

Mar. 24, 2020  (EP) .................................... 20165352

(51) Int. Cl.
G05B 13/02  (2006.01)
G05B 13/04  (2006.01)
G06N 3/04  (2023.01)
G06N 3/08  (2023.01)

(52) U.S. Cl.
CPC ............ *G05B 13/027* (2013.01); *G06N 3/04* (2013.01); *G06N 3/08* (2013.01); *G05B 13/042* (2013.01)

(58) Field of Classification Search
None
See application file for complete search history.

(56) References Cited

U.S. PATENT DOCUMENTS

| 5,477,444 A | * | 12/1995 | Bhat | ..................... B01J 19/0033 700/48 |
| 2006/0241786 A1 | | 10/2006 | Boe et al. | |
| 2019/0129366 A1 | * | 5/2019 | Skeffington | .......... G05B 13/041 |
| 2019/0150357 A1 | * | 5/2019 | Wu | ......................... H04N 7/188 |

(Continued)

FOREIGN PATENT DOCUMENTS

| CN | 108897227 A | 11/2018 |
| JP | H11224106 A | 8/1999 |

(Continued)

OTHER PUBLICATIONS

Boyd, Stephen et al. "Linear Matrix Inequalities in System and Control Theory." SIAM Studies in Applied Mathematics; vol. 15. 1994. Retrieved from the Internet on Feb. 24, 2021: https://web.stanford.edu/~boyd/lmibook/lmibook.pdf. 205 Pages.

(Continued)

*Primary Examiner* — Jennifer L Norton
(74) *Attorney, Agent, or Firm* — NORTON ROSE FULBRIGHT US LLP; Gerard A. Messina

(57) ABSTRACT

A controller for generating a control signal for a computer-controlled machine. A neural network may be applied to a current sensor signal, the neural network being configured to map the sensor signal to a raw control signal. A projection function may be applied to the raw control signal to obtain a stable control signal to control the computer-controllable machine.

12 Claims, 5 Drawing Sheets

(56) References Cited

U.S. PATENT DOCUMENTS

| | | | | |
|---|---|---|---|---|
| 2019/0303762 | A1* | 10/2019 | Sui | G06N 3/04 |
| 2020/0210818 | A1* | 7/2020 | Terasaki | G06N 3/04 |
| 2020/0364553 | A1* | 11/2020 | Amos | G06N 3/08 |
| 2021/0276187 | A1* | 9/2021 | Tang | G06N 3/08 |
| 2021/0326678 | A1* | 10/2021 | Smolyanskiy | G06T 1/20 |
| 2022/0040852 | A1* | 2/2022 | Abdou | B25J 9/1664 |
| 2022/0373989 | A1* | 11/2022 | Dierckx | G05B 19/042 |
| 2023/0297073 | A1* | 9/2023 | Phan | G06N 5/01 |
| | | | | 700/28 |
| 2024/0308082 | A1* | 9/2024 | Konar | B25J 9/1664 |

FOREIGN PATENT DOCUMENTS

| | | | |
|---|---|---|---|
| JP | 2014112282 | A | 6/2014 |
| JP | 202004398 | A | 1/2020 |
| WO | 9300618 | A1 | 1/1993 |
| WO | 9514277 | A1 | 5/1995 |

OTHER PUBLICATIONS

Agrawal, Akshay et al. "Differentiable Convex Optimization Layers." 33rd Conference on Neural Information Processing Systems (NeurIPS 2019), Vancouver, Canada. Oct. 28, 2019. Retrieved from the Internet on Feb. 24, 2021: https://arxiv.org/abs/1910.12430. 19 Pages.

* cited by examiner

CONTROLLER WITH NEURAL NETWORK AND IMPROVED STABILITY

CROSS REFERENCE

The present application claims the benefit under 35 U.S.C. § 119 of European Patent Application No. EP 20165352.4 filed on Mar. 24, 2020, which is expressly incorporated herein by reference in its entirety.

FIELD

The present invention relates to a controller for generating a control signal for a computer-controlled machine, a controlling method for generating a control signal for a computer-controlled machine, a training method for training a neural network for use in controlling a computer-controlled machine, and a training system for training a neural network for use in controlling a computer-controlled machine.

BACKGROUND INFORMATION

Despite recent high-profile advances and state-of-the-art performance on many tasks, deep reinforcement learning has still found limited application in "safety-critical" domains where an incorrect action, either during training or at runtime, can substantially impact the system being controlled. In contrast, the field of robust control, dating back many decades, has been able to provide rigorous bounds on when controllers will succeed or fail in controlling a system of interest. In particular, if the controlled system can be properly bounded in certain ways, robust control techniques give provable guarantees that the resulting system will be stable. However, the simple, e.g., often linear, nature of the policies resulting from certifiably robust control techniques often limits performance in typical scenarios.

The design of feedback controllers for dynamical systems with uncertainties and/or unknown disturbances is addressed in robust control. Specifically, robust control policies aim to design controllers with guaranteed performance for worst-case realizations of uncertainties or disturbances in the system. In $H_\infty$ control, in particular, the goal is to stabilize a system while attenuating the effect of exogenous disturbances on some performance output (such as the LQR cost). This effect is characterized by the $\mathcal{L}_2$ gain of the disturbance-to-output map, defined as the ratio between the $\mathcal{L}_2$ norm of the output and the disturbance. Despite providing performance guarantees, robust control policies are typically overly conservative due to considering worst-case scenarios or being limited to linear classes of controllers.

Many classes of robust control problems, even many that were originally formulated in the frequency domain (e.g., an alternative way of characterizing dynamical systems) can ultimately be formulated using linear matrix inequalities (See, e.g., "Linear Matrix Inequalities in System and Control Theory", by Stephen Boyd, Laurent El Ghaoui, Eric Feron, and Venkataramanan Balakrishnan). The resulting control problems can therefore often be formulated as semidefinite programs, which can be solved to produce controllers for reasonably-sized domains using off-the-shelf software.

PCT Application No. WO 93/00618 describes an adaptive control system uses a neural network to provide adaptive control when the plant is operating within a normal operating range, but shifts to other types of control as the plant operating conditions move outside of the normal operating range.

Reinforcement learning, in particular deep reinforcement learning, in which optimal control policies are approximated by neural networks, has shown impressive results in learning a variety of complex control tasks. However, due to its lack of safety guarantees, deep reinforcement learning has been predominantly applied to simulated environments or highly-controlled real-world problems, where potential system failures are either not costly or not possible. For deep reinforcement learning methods to be adopted in safety-critical settings, it is necessary that they be coupled with safety guarantees of some form, as addressed in the present work. Indeed, it was found that control policies approximated by neural networks can fail completely in practice, e.g., when confronted with slightly different sensor readings or disturbances than encountered during training. In particular, it was found that under adversarial disturbances the stability of the control policy could completely fall away; even if the adversarial disturbances were bounded in size. There is a desire for a safe reinforcement learning wherein a control policy can be run while maintaining stability of the system. Moreover, it is desired that rather than adopting local smoothness assumptions about the dynamics or cost, global uncertainty characterizations are used, e.g., as in robust control.

SUMMARY

It would be advantageous to have an improved controller for generating a control signal for a computer-controlled machine. For example, the machine may have multiple parts that interact in complex manner. For example, the multiple parts may be considered as a dynamical system or approximated thereby.

In accordance with an example embodiment of the present invention, the controller may apply a neural network to a sensor signal. The neural network is trained, e.g., using direct search or reinforcement learning, to control the machine in some way, e.g., so that it reaches a particular state, or that its states follow a trajectory. The control may also be limited to a part of the state, e.g., the position of a vehicle, say, car, or drone; e.g., to control a car to stay in a lane, or a drone to stay in 2d-plane, etc. However, rather than using the output of the neural network, e.g., the raw control signal directly to control the machine, a projection function is applied to the raw control signal to obtain a stable control signal. The projection function maps a raw control policy space to a stable control policy space of predefined stable control policies. The effect is that the neural network-based control is limited to control policies that are predefined to be stable. For example, control policies may be predefined to be stable, e.g., by requiring a control policy to satisfy a stability equation, e.g., a decreasing Lyapunov function. The stable control signal may be used to control the computer-controllable machine. The neural network may be trained together with the projection function to pick good control policies yet under the restriction that only control policies can be used that are stable.

In an example embodiment of the present invention, the projection function is a continuous, piecewise differentiable function. This has the advantage that reinforcement learning, e.g., may be performed. Note that even if the projection function is implemented as an optimization layer, the projection function may be a continuous, piecewise differentiable function. The reinforcement learning may adjust the neural network to decrease a loss function. For example, the loss function may measure how close the system, including the neural network, reaches a goal, e.g., reaches a state, follows a trajectory, maintains restriction on all or some state variables, etc.

For example, in multiple learning steps, the neural network may be adjusted in a way to decrease the loss function. Learning steps may be repeated, e.g., until a desired accuracy is reached, until a pre-defined number of iterations, until the loss function no longer decreases, and so on. Adjusting the neural network may be done using many learning algorithms, including back propagation.

An interesting advantage from using a neural network at the front end is that a large variety of sensor inputs may be used. The neural network may be provided processed information such as position and speed of one or more of the machine's parts, but instead the neural network may learn to derive the relevant information itself. For example, the sensor system may comprise one or more of: an image sensor, a radar, a lidar, a pressure sensor, etc. The sensor signal may thus comprise 2d-dimensional data, such as image data. For example, for a robot arm controller the sensor data may include one or more images the show the robot arm.

The controller can be used in a wide variety of control tasks. For example, the machine may be one of: a robot, a vehicle, e.g., a car, a domestic appliance, a power tool, a manufacturing machine, drone, e.g., a quadrotor, etc. In an embodiment, a controller provides guarantees of robust control but also the power of deep reinforcement learning. The stability specifications that are produced by traditional robust control methods under different models of system uncertainty may be respected yet at the same time improved control may be obtained.

For example, robust control methods such as $H_\infty$ control produce both a stabilizing controller and a Lyapunov function that proves the stability of the system under certain worst-case perturbations. These specifications may be used to construct a new class of reinforcement learning policies, which projects a nominal, e.g., raw, control policy into the space of stabilizing controllers specified by the robust Lyapunov function. The raw control policy may be nonlinear and neural network based. The result is a nonlinear control policy, trainable using deep reinforcement learning, that is nonetheless guaranteed to be stable under the same conditions as the simple traditional robust control policy.

Embodiments were shown to improve upon traditional LQR while, unlike non-robust LQR and neural network methods, remaining stable even against worst-case allowable perturbations of the underlying dynamical system.

The controller and training system may be electronic devices and may comprise a computer. The controlling method described herein may be applied in a wide range of practical applications. Such practical applications include control of computer-controlled machines, including fully or partially self-driving vehicles, robot arms and drones.

Further aspects are a training system configured to train the neural network used in the controller. Further aspects are a controlling method and a training method. Embodiments of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an example embodiment of the present invention, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the present invention are described, by way of example only, with reference to the figures. Elements in the figures are illustrated for simplicity and clarity and have not necessarily been drawn to scale. In the figures, elements which correspond to elements already described may have the same reference numerals.

LIST OF REFERENCE NUMERALS IN FIGS. 1-4, 7A, 7B

Figure 1:
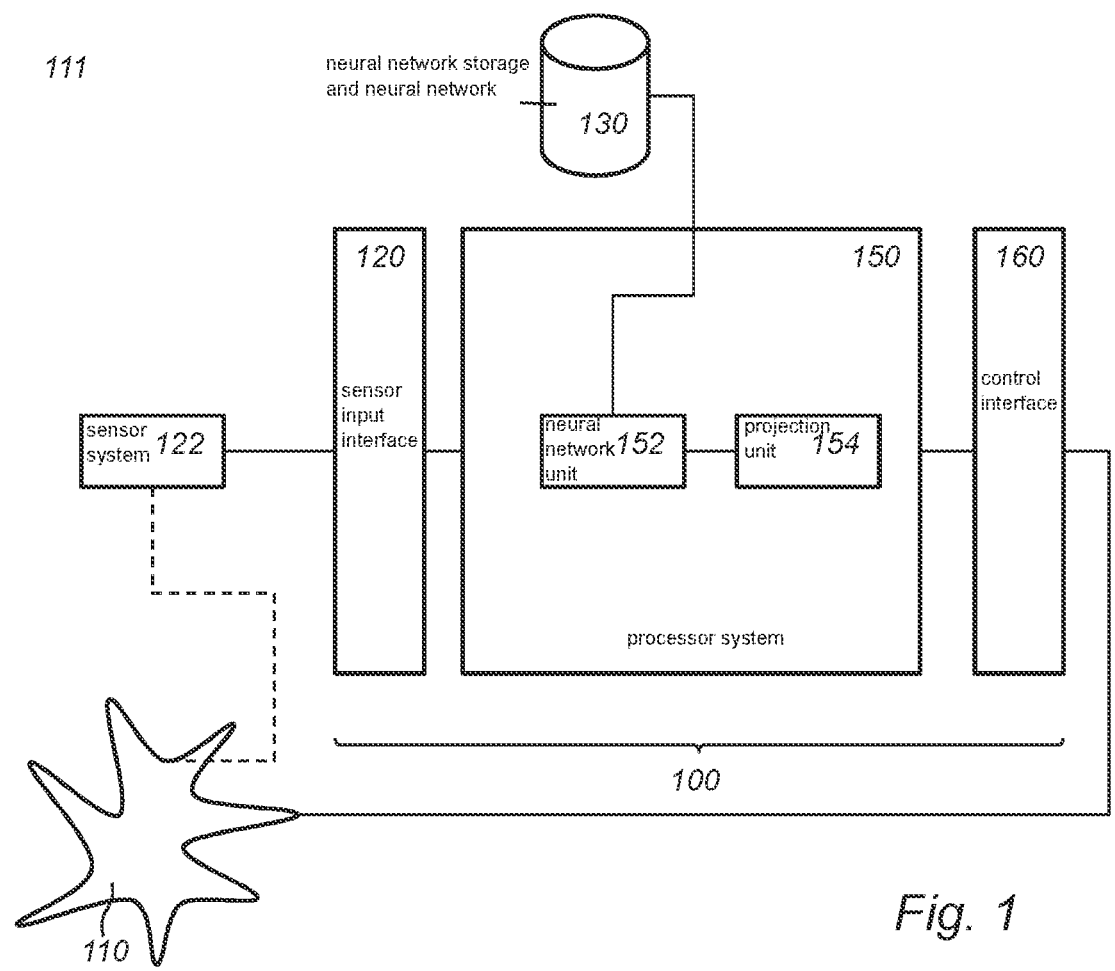
FIG. 1 schematically shows an example of an embodiment of a controller for generating a control signal for a computer-controlled machine, in accordance with the present invention.

The following list of references and abbreviations is provided for facilitating the understanding of the drawings and shall not be construed as limiting the scope of the present invention.

100 a controller
110 a computer-controlled machine
111 a machine learnable system
120 a sensor input interface
122 a sensor system
130 a neural network storage and neural network
150 a processor system 152 a neural network unit
154 a projection unit
156 a training unit
160 a control interface
170 a training set
200 a physical system
210 movable parts
212 an actuator
214 a sensor
220 a controller
230 a camera
240 a robot arm
241 a link
242 a tool
243 a joint
300 a controller
330 a processor
340 a memory
350 a communication interface
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EXAMPLE EMBODIMENTS

While the present invention is susceptible of embodiment in many different forms, there are shown in the figures and will herein be described in detail one or more specific example embodiments, with the understanding that the present disclosure is to be considered as exemplary of the principles of the present invention and not intended to limit it to the specific embodiments shown and described. In the following, for the sake of understanding, elements of embodiments are described in operation. However, it will be apparent that the respective elements are arranged to perform the functions being described as performed by them.

Further, the present invention disclosed herein is not limited to the embodiments only, but also includes every other combination of features described herein.

FIG. 1 schematically shows an example of an embodiment of a machine learnable system 111, in accordance with the present invention. System 111 comprises a controller 100 and a computer-controlled machine 110. For example, controller 100 may be configured to generate a control signal for machine 110. The machine may comprise multiple parts interacting which may interact in a complicated, e.g., non-linear, way, e.g., in so-called a dynamical system. The dynamical system may be explicitly modelled, although this is not necessary. For example, the dynamic system may be nonlinear or have time-varying parameters. Such dynamical systems are hard to control, e.g., to reliable control into a desired state, or to follow a desired trajectory. Although a neural network may be trained to control such a system with success, neural networks have the drawback that their solutions provide no guarantees. Although neural networks are often remarkably efficient, e.g., compared to traditional controllers, they may have unexpected breakdowns. For example, a neural network confronted with a state or with sensor inputs that are even slightly different than known from training can suddenly become unstable. Clearly, for real-live applications such a situation is not desirable. In an embodiment, a controller is provided that is efficient and provides guarantees about its stability.

For example, in an embodiment the machine comprises a so-called cart-pole. In this case, the parts may comprise the cart and the pole. A control signal may comprise a position, velocity and/or direction, etc. with which the cart is steered. Cart and pole have a complicated interaction and can be regarded as a dynamic system.

The computer-controllable machine 110 may by any machine in which control is an issue. For example, the machine may comprise one or more of: a robot, a vehicle, a domestic appliance, a power tool, a manufacturing machine, a drone, and so on. For example, a drone may be controlled to remain stable at a particular point in the air, or to remain in a 2d plane, or to follow a particular trajectory. For example, in a vehicle, a controller may be configured for cruise control, e.g., to keep the vehicle at a predefined speed; or for trajectory assist, such lane assist. For example, the control signal may control speed and steering to keep the position of the vehicle in a lane.

Machine 100 may be computer-controlled by controller 100. Machine 100 may comprise a further computer for controlling machine 110, e.g., dependent on the stable control signal of controller 100.

For example, controller 100 may comprise a control interface 160 configured to transmit a stable control signal to the computer-controllable machine 110 to control it. The control may be direct, e.g., the output of controller 100 may directly control, e.g., actuators of machine 110, but may also be indirect. For example, the control signal may be to increase force at some point by some amount, e.g., at a rotor. In such a case, machine 110 may comprise a further controller to translate the control signal coming from controller 100 into a form suitable for the machine 110, e.g., its actuators or the like.

System 111 may comprise a sensor system 122 configured to sense the computer-controlled machine 110. Controller 100 may comprise a sensor input interface 120 configured to receive a sensor signal from sensor system 122. For example, the sensor system 122 comprises one or more of: an image sensor, a radar, a lidar, a pressure sensor. A sensor signal may comprise a 1-dimensional sensor signal, such as a pressure sensor, e.g., configure to measure pressure at a particular point. A sensor signal may comprise a 2-dimensional sensor signal, such as an image sensor. For example, one or more cameras may record the position of a robot arm, or the position of a vehicle in its lane, and so on. Interestingly, such high-dimensional sensor signals may be directly used by controller 100.

In an embodiment, control 110 receives a sensor signal and computes therefrom a next action, e.g., updated values for actuator inputs or the like. For control, one may repeatedly apply controller 100 to a current sensor signal obtained from the sensor system 122 to repeatedly obtain a stable control signal for controlling the computer-controllable machine 110. For example, one may discretize the actions which are to be performed. The frequency with which the action is updated may differ for different embodiment. For example, this may be multiple times per second, e.g., 10 times, e.g., even more, if the dynamical system changes quickly, or if external disturbances can change quickly. The actions can be updated slower, e.g., once per second, or once per 2 seconds, and so on.

In an embodiment, the controller 100 may be configured to compute a control signal to cause the state of machine 110 to be in a desired state. For example, the state may be a predefined state, e.g., a zero-state or rest state. In an embodiment, the controller is configured to obtain, e.g., receive, a goal state, in which case the controller 100 is configured to cause the machine to reach the goal state. The goal state may be generated by controller 110, e.g., to cause the machine state to follow a trajectory; the controller may comprise a goal state interface to receive a goal state, e.g., from a further computer or operator.

In an embodiment, the controller 100 may be configured to compute a control signal to cause part of the state of machine 110 to be in a desired state. For example, the state may be position and speed of a vehicle, e.g., a car, while the control signal is configured to maintain a speed but not to affect steering, e.g., in case of cruise control. For example, for a drone the control signal may keep the drone stable in a 2d-plane without further restricting the movement within the plane. However, in an embodiment, the full state of the machine may be controlled by the controller.

In an embodiment, controller 100 is configured to change the goal state along a trajectory, so that the machine follows some trajectory. For example, this may be used to steer a vehicle along a trajectory, or to move a robot arm along a trajectory, etc. For example, at a first frequency $f_1$ the actions may be updated for a current sensor signal, while at a second frequency $f_2$ the goal state is updated to a current goal state. The two frequencies may be equal or different depending on the applications. In an embodiment, $f_1 > f_2$.

Figure 2A:
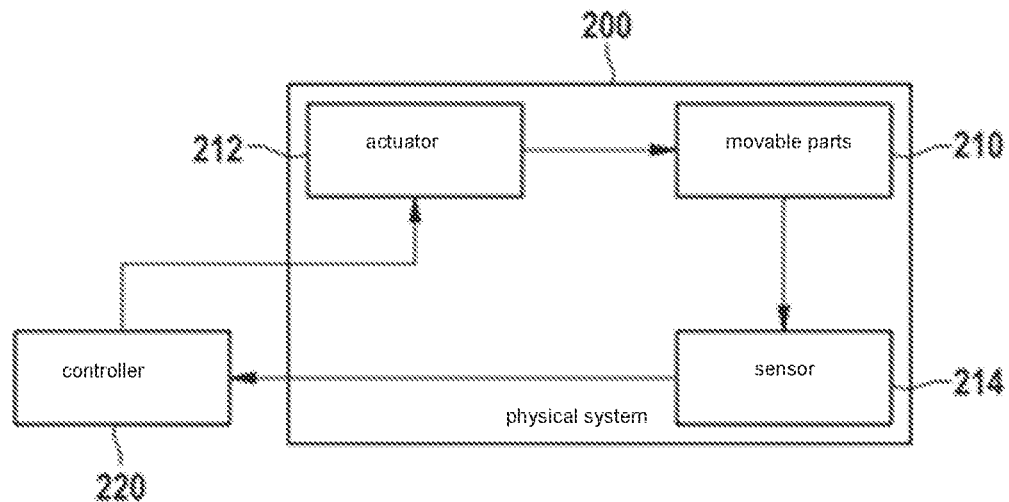
FIG. 2a schematically shows an example of an embodiment of a physical system, in accordance with the present invention.

FIG. 2a schematically shows an example of an embodiment of a computer-controlled machine 200, e.g., a physical system. Shown are movable parts 210, which may be known movable parts such as joints, linkages, blocks, axes, wheel, gears, etc. In particular, the movable parts may comprise multiple joints. The machine may be configured with actions that can be performed on the machine. For example, the actions may comprise rotating and/or translating a joint. The joints may be connected to other moving parts, e.g., linkages. For example, joints may be prismatic, e.g., a slider, only translation; cylindrical, e.g., rotating and sliding; or revolute, e.g., only rotation.

FIG. 200 also shows an actuator 212 and a controller 220, e.g., an embodiment of controller 100. Actuator 212 is configured to receive a control signal from controller 220 to cause a change in the location parameters of the movable parts. For example, some part may be shifted, turned, or the like. A sensor system 214, e.g., a sensor 214, provides feedback on the state of the machine. For example, sensor 214 may comprise one or more image sensors, force sensors, etc.

For example, the machine may be a robot, a vehicle, a domestic appliance, autonomous driving car, a power tool, a manufacturing machine, etc. Machine 200 is at least partially under computer-control. For example, machine 200 may be configured to go to a particular goal state. Machine 200 may have mode in which an operator, e.g., a human controls machine 200, e.g., fully or partially. Controller 220 may be used to control a system. The planning task may be continuous, discrete or discretized. The observations may be continuous and high-dimensional, e.g., image data.

For example, the machine may be a vehicle, e.g., a car, e.g., configured for autonomous driving. Typically, the car makes continuous observations, e.g., distance to the exit, distance to preceding vehicle, exact position inside a lane, etc. A controller of the vehicle may be configured to determine how to act and where to drive, e.g., change to another lane. For example, the sensor may be used to learn a state of the car in its environment, while the driving actions that the car may take influence the state of the car.

For example, the machine may be a manufacturing machine. For example, the manufacturing machine may be arranged with a continuous or discrete set of actions, possibly with continuous parameters. For example, the actions may comprise a tool to use and/or parameters for a tool, e.g., an action drill at a specific location or angle, etc., For example, the manufacturing machine may be a computer numerical control (CNC) machine. A CNC machine may be configured for the automated control of machining tools, e.g., drills, boring tools, lathes, 3D printers, etc., by means of a computer. A CNC machine may process a piece of material, e.g., metal, plastic, wood, ceramic, or composite, etc., to meet specifications.

The observable state of the manufacturing machine is often continuous and noisy, e.g., the noisy location of the drill, a noisy location of the part that is manufactured. An embodiment may be configured to plan how to create the part, e.g., first drill at that location, then do some second action, and so on.

In an embodiment, the controller is configured to steer the machine 200 into a rest-state, e.g., a state suitable for powering off, e.g., a state in which the machine is safe for an operator to approach, e.g., for maintenance.

Figure 2B:
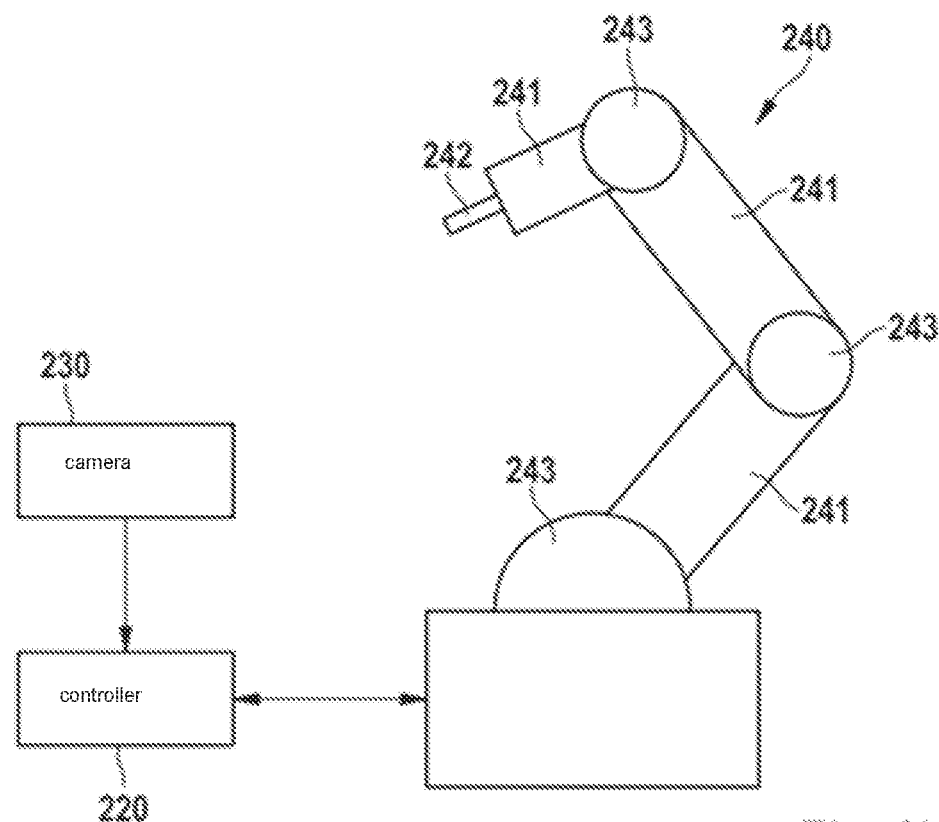
FIG. 2b schematically shows an example of an embodiment of a robot arm, in accordance with the present invention.

FIG. 2b schematically shows an example of an embodiment of a robot arm 240. In an embodiment, the machine comprises a robot arm. An example, of a robot arm is shown in FIG. 2b. For example, the robot arm may comprise one or more links 241, tools 242, and joints 243. The robot arm may be controlled, e.g., by a controller 220, e.g., to actuate the joints. Robot arm 240 may be associated with one or more sensors, some of which may be integrated with the arm. A sensor may be a camera, e.g., a camera 230. The sensor outputs, including optionally, an image, may be an observable state of the robot arm. In an embodiment, a controller is configured to steer the robot arm into a rest-state, etc.

Even though observations may be continuous and high-dimensional, e.g., states of all joints, sensor measurements such as camera images, etc., the controller may compute a safe action to reach a desirable state and/or to follow a desirable trajectory.

Returning to FIG. 1. Controller 100 may comprise a processor system 150 configured to apply a neural network and a projection layer to the sensor signal.

For the purpose of exposition, the neural network and projection layer are shown and discussed separately, but it is understood that in an embodiment a neural network may have multiple layers one of which is a projection layer. Typically, the projection will be the final layer in such a neural network, but this is not strictly necessary. For example, further processing may be performed on the output of the neural network, e.g., to transform from one domain to another, e.g., scale the signal, transform coordinate systems, and so on. Preferably, the further processing preserves the stability improvements offered by the projection layer.

For example, system 111 may comprise neural network storage configured for storing a trained neural network 130. Interestingly, the neural network 130 defines a raw control policy for the computer-controlled machine 110. For example, a control policy is a function that maps a sensor signal to an action. If neural network 130 were trained without the projection layer, then the output of the neural network may be used as a control signal. However, such a controller may suffer from a break down in case the machine or sensor values venture into unexpected territory.

The neural network storage may or may not be part of controller 100. For example, the neural network parameters may be stored externally, e.g., in cloud storage, or locally, e.g., in a local storage, e.g., a memory, hard drive or the like.

For a dynamic system, a large set of potential policies may be defined which are stable. For example, that are guaranteed to reach a particular desired goal state, e.g., the origin, as time increases. Such stability is typically defined under some assumption on the disturbances that can be expected in the machine. Clearly, if the external disturbances are allowed to be unlimited then no stable policy can exist in any case. However, under, say, a norm limit on the external disturbance stable policies can be defined. Although a stable policy has the advantage of providing a guaranteed stability, e.g., reaching a particular goal state at some point in time, or coming arbitrarily close to it, there is typically no indication which stable policy will do so efficiently. System 150 is advantageously provided with a projection function which maps an input into the space of stable policies that are defined for the machine, e.g., for the dynamic system. The projection function maps a raw control policy space to a stable control policy space of predefined stable control policies. Thus, by applying the projection a raw control signal is mapped to a stable control signal.

Accordingly, the neural network remains free to learn any raw control signal as it sees fit, however, the output of the neural network is passed through the projection function, e.g., as encompassed in a projection layer. A neural network is obtained which has the large parameter space and efficient learning of neural networks but is guaranteed to provide a control policy that satisfies some condition, e.g., a stability criterion. In essence, a neural network is obtained which is free to learn any control policy so long as it is stable.

For example, processor 150 may be configured with a neural network unit 152 and a projection unit 154. For example, neural network unit 152 may be configured to apply neural network 130 to the sensor signal to obtain a raw control signal. Note that if the neural network 130 has been trained together with the projection layer, the raw control signal cannot be directly applied to machine 110. Rather, the raw control signal may be considered as an index, a pointer, into the space of stable polices.

Neural network unit 152 and projection unit 154 may be configured for a fixed goal state, e.g., a rest-state or the like, but neural network unit 152 and projection unit 154 may instead be configured to accept as input a goal state and is configured to control the computer-controllable machine 110 to reach the goal state. For example, the goal state may be a parameter of the projection function but a neural network input for neural network 130.

The sensor signal input for neural network 130 and the raw control signal output of neural network 130 may be represented as vector, e.g., comprising real values number. For example, values may be scaled, e.g., between 0 and 1. For example, the neural network may comprise such known neural network layers as convolutional layers, ReLu layers, Pooling layers, and the like. The dimension of the raw control signal may be the same as the dimension stable control space. Typically, the dimension of the raw control signal may be the same as the dimension of the output of the projection function. For example, in an embodiment, the input to the neural network comprises image data and the neural network comprises convolutional layers.

The output of the projection function represents the stable control signal, e.g., may represent an input for the computer-controlled machine 110. For example, the stable control signal may be a vector. The elements of the vector may be relative actions, e.g., increase a distance, a voltage, an angle and so on. The elements of the vector may be absolute actions, e.g., set speed or distance, etc., to a particular value.

The projection function may be configured to map a control policy, e.g., an arbitrary control policy, to the space of stable control policies. Such a space may be defined in various ways. For example, typically a stability equation may be imposed on the stable control policies. For example, it may be required that a Lyapunov function is decreasing for stable control policies. As a mapping from one space to another, the projection may be taken to be a continuous, piecewise differentiable function; this means that learning algorithms may propagate through the projection function.

Depending on the dynamics of the machine various projection layers are possible. An example, of a projection layer restricts the control signal to safe values. For example, a raw control signal $\hat{\pi}(x)$ may be allowed so long as $\rho^T \hat{\pi}(x) \leq \eta$ for a vector $\rho$ and a threshold $\eta$. However, if the raw control signal $\hat{\pi}(x)$ exceeds these safe bounds, its values are reduced, e.g., proportional to the value $(\rho^T \hat{\pi}(x) - \rho)$. For example, the following projection function $\mathcal{P}$ may be defined:

$$\pi(x) = \mathcal{P}(\hat{\pi}(x))$$

$$= \begin{cases} \hat{\pi}(x) & \text{if } \rho^T \hat{\pi}(x) \leq \eta, \\ \hat{\pi}(x) - \dfrac{\rho^T \hat{\pi}(x) - \eta}{\rho^T \rho} \rho & \text{otherwise} \end{cases}$$

for sensor input x, stable control signal $\pi(x)$, raw control signal $\hat{\pi}(x)$, vector $\rho$ and value $\eta$. The neural network 130 may implement the function ft. Note that the above projection layer may be implemented in a neural network layer.

In another example, the projection function may solve an optimization problem. The solution to the optimization problem being piecewise differentiable with respect to the raw control signal. In general, the projection function may be chosen with respect to the dynamic system. The dynamic system may define, e.g., as in control theory, a set of stable control policies. The neural network may be taught to select an appropriate one of the stable control policies to reduce a loss function.

Figure 3:
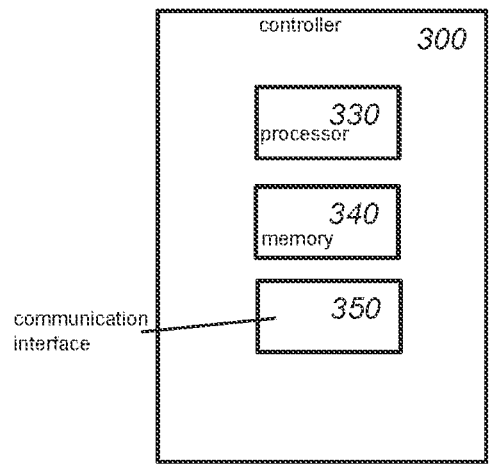
FIG. 3 schematically shows an example of an embodiment of a controller for generating a control signal for a computer-controlled machine, in accordance with the present invention.

FIG. 3 schematically shows an example of an embodiment of a controller 300. For example, the controller 300 of FIG. 1b may be used to control machine 110. Controller 300 may comprise a processor system 330, a memory 340, and a communication interface 350. Controller 300 may communicate with machine 110, external storage, input devices, output devices, and/or one or more sensors over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The execution of a controller, e.g., controller 100, controller 300, etc. may be implemented in a processor system, e.g., one or more processor circuits, e.g., microprocessors, examples of which are shown herein. FIGS. 1 and 3 show functional units that may be functional units of the processor system. For example, the figures may be used as a blueprint of a possible functional organization of the processor system. The processor circuit(s) are not shown separate from the units in these figures. For example, the functional units shown may be wholly or partially implemented in computer instructions that are stored at the controller, e.g., in an electronic memory, and are executable by a microprocessor of the controller. In hybrid embodiments, functional units are implemented partially in hardware, e.g., as coprocessors, e.g., neural network coprocessors, and partially in software stored and executed on the controller. Parameters of the network and/or training data may be stored locally or may be stored in cloud storage.

Figure 4:
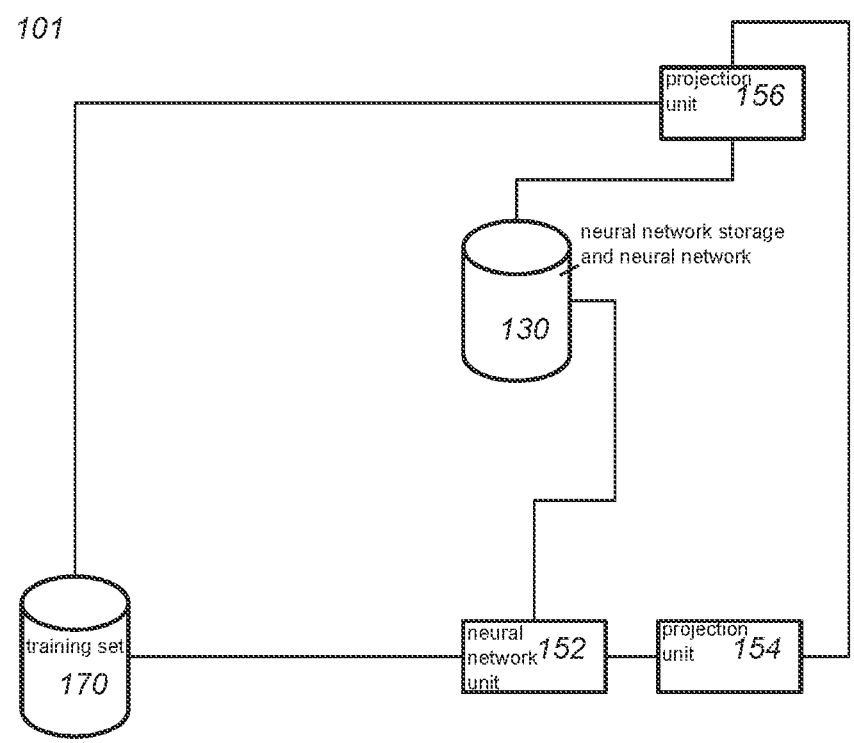
FIG. 4 schematically shows an example of an embodiment of a training system for training a neural network for use in controlling a computer-controlled machine, in accordance with the present invention.

FIG. 4 schematically shows an example of an embodiment of a training system 101 for training a neural network for use in controlling a computer-controlled machine. For example, training system 101 may be used to train the neural network 130 which is used in controller 100. Controller 300 may be adapted to run training system 101 as well or instead of controller 100, if desired, e.g., by providing access to training data and/or software configured to perform the training function.

For example, training system 101 may comprise a training data interface for accessing training data. For example, the training data may comprise sensor signals representative for a sensor system sensing the computer-controlled machine. The sensor data may be wholly or partially obtained from a real machine 110, e.g., by measuring using a sensor system; the sensor data may be wholly or partially obtained by simulation, e.g., simulation of machine 110.

System 101 may comprise a neural network storage configured for storing a neural network, the neural network defining a raw control policy for the computer-controlled machine, e.g., a storage as in controller 100. Training system 101 is configured for a neural network and projection function, e.g., as controller 100. For example, system 101 may comprise a neural network unit 152 and projection unit 154 as in controller 100, except that the neural network of neural network unit 152 is not yet fully trained.

Training system 101, e.g., a processor system thereof, may be configured to apply the neural network to a sensor signal, e.g., as obtained from training data 170, thus obtaining a neural network output, e.g., the raw control signal, and to apply the projection function thereto, thus obtaining a stable control signal. Because of the projection layer, the resulting control signal will be stable, but that does not mean that it is any good. Accordingly, a loss function may be applied to the stable control signal to obtain a value that expresses the goodness of the control policy defined by the combination of neural network and projection layer. For example, the machine may be simulated for a period of time and the progress towards a goal state may be determined. During the period of time the action may be updated or not. The neural network parameters are then modified to improve the loss function. For example, a backpropagation may be applied to the loss function, projection layer and neural network.

Embodiments of system 100 or 101 may comprise a communication interface, which may be selected from various alternatives. For example, the interface may be a network interface to a local or wide area network, e.g., the Internet, a storage interface to an internal or external data storage, a keyboard, an application interface (API), etc. The systems 100 and 101 may have a user interface, which may include well-known elements such as one or more buttons, a keyboard, display, touch screen, etc. The user interface may be arranged for accommodating user interaction for configuring the systems, training the networks on a training set, or applying the system to new sensor data, setting a goal state, setting trajectory, etc.

Storage may be implemented as an electronic memory, say a flash memory, or magnetic memory, say hard disk or the like. Storage may comprise multiple discrete memories together making up the storage. Storage may comprise a temporary memory, say a RAM. The storage may be cloud storage. Storage may be used to store a neural network, software, training data and so on.

Systems 100 and/or 101 110 may be implemented in a single device or in a, possibly distributed, system. Typically, the systems 100 and 101 comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 100 and 101 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below several further optional refinements, details, and embodiments are illustrated.

Consider controlling a machine characterized by a non-linear, continuous-time, dynamical system, such as $\dot{x}(t)=f(x(t), u(t), \epsilon(t))$, (1) where $x(t) \in \mathbb{R}^s$ denotes the state at time t, $u(t) \in \mathbb{R}^a$ is the control input, $\epsilon(t) \in \mathbb{R}^d$ is an external (possibly stochastic) disturbance term, and where $\dot{x}(t)$ denotes the time derivative of the state x at time t. These dynamics may be written in an alternative, potentially time-varying, linearized form for which it is possible to obtain robust control specifications guaranteeing the stability of the system. Given such robust control specifications, one can machine-learn a nonlinear policy, e.g., deep neural network-based, that provably satisfy these specifications while optimizing some objective of interest.

In an embodiment, learning provably robust nonlinear controllers with reinforcement learning may be done as follows: Consider the nonlinear, e.g., neural network-based, policy class $\hat{\pi}_\theta: \mathbb{R}^d \to \mathbb{R}^a$ parameterized by $\theta$. Parameters $\theta$, e.g., the neural network parameters, may be learnt such that the projection of the resultant policy onto some set of provably stable controllers optimizes some (infinite-horizon) control objective. Formally, one seeks to find $\theta$ to optimize $$\text{minimize}_\theta \quad \int_0^\infty \ell(x(t), \pi_\theta(x(t))) dt \qquad (2)$$

$$\text{subject to} \quad \dot{x}(t) = f(x(t), \pi_\theta(x(t)), \epsilon(t))$$

$$\text{with} \quad \pi_\theta(x) = \mathcal{P}_{u \in C_n}(\hat{\pi}_\theta(x)),$$

where $\ell(\cdot)$ is a performance objective, $\mathcal{C}_n$ characterizes a set of (potentially nonlinear) policies that are stabilizing under the given robust control specifications, and $\mathcal{P}_{u\in\mathcal{C}_n}(\cdot)$ denotes the projection onto this set. For example, $\hat{\pi}_\theta(x)$ is the raw control signal, e.g., the neural network output, while $\pi_\theta(x)$ is the stable control signal, obtained by projection mapping the raw control signal.

The projection operator can be implemented in a differentiable manner, e.g., by using differentiable convex optimization layers, e.g., see the paper "Differentiable Convex Optimization Layers", by A. Agrawal, B. Amos, S. Barratt, S. Boyd, S. Diamond, and J. Zico Kolter. Therefore, to optimize this problem, one can train the neural network $\hat{\pi}_\theta(x)$ via any variety of approaches (e.g. direct policy search or virtually any reinforcement learning algorithm) by projecting its result onto the set of stability criteria and then propagating the gradients of the corresponding loss through both the projection and the neural network. The above problem can be regarded as infinite-horizon and continuous in time, but in practice, one may optimize it in discrete time over a finite time horizon. By transforming the output of a neural network, one can employ an expressive policy class to optimize the objective of interest while ensuring the resultant policy will stabilize the system during both training and testing.

In addition to designing for stability, it is often desirable to design controllers that optimize some performance objective. Different classes of objectives may be employed in different settings. For instance, in the $H_\infty$ paradigm, the objective is to minimize the ratio between the $\mathcal{L}_2$ norm of some system output and of any (potentially unbounded) disturbance, i.e., the $\mathcal{L}_2$ gain of the disturbance-to-output map. For a time-dependent signal $x(t):[0, \infty) \to \mathbb{R}^s$, the $\mathcal{L}_2$ norm of $x(t)$ may be defined as $$\|x\|_2 = \sqrt{\int_0^\infty \|x(t)\|_2^2 dt}.$$

For example, consider the traditional "linear quadratic regulator" (LQR) objective, given by $$\int_0^\infty \left(x(t)^T Q x(t) + u(t)^T R u(t)\right) dt, \qquad (3)$$

for some $Q \in \mathbb{S}^{s \times s} \geq 0$ and $R \in \mathbb{S}^{a \times a} \geq 0$. Minimizing the LQR cost subject to the relevant dynamics equations can be cast as the convex optimization problem $$\min_{S, Y \in \mathcal{C}_l} tr(QS) + tr(R^{1/2} Y^T S^{-1} Y R^{1/2}), \qquad (4)$$

where $\mathcal{C}_l$ is a constraint set characterizing linear controllers that ensure stability of the dynamics within the relevant domain, as described below. In this example, Q is a s×s positive definite matrix, and R is a×a positive definite matrix.

Equation 4 defines the solution to the LQR problem. Given some specific dynamics description, e.g., norm-bounded LDIs or polytopic, this optimization can be solved. In this manner one may thus obtain an optimal linear policy and a Lyapunov function. Having a Lyapunov function, this defines a set of stable policies, including the optimal linear policy, but also including nonlinear policies. The raw control output of the neural network may be projected onto this set of policies that stabilize the system, e.g., as certified by the Lyapunov function that one gets by solving equation (4).

Consider controlling a nonlinear, continuous-time, dynamical system of the form presented in Equation (1). It is often possible and convenient to write the dynamics in an alternative (potentially time-varying) linearized form $$\dot{x}(t) = A(t)x(t) + B(t)u(t) + G(t)w(t), \qquad (5)$$

where $A(t) \in \mathbb{R}^{s \times s}$, $B(t) \in \mathbb{R}^{s \times a}$, and $G(t) \in \mathbb{R}^{s \times d}$, and where w(t) is a term that can capture both the deviation from linearity and any external disturbances. Moreover, w(t) itself can depend on x(t) and u(t); though this dependence is omitted in the notation for brevity. Within this class of models, referred to as linear differential inclusions (LDIs). Its several sub-cases cover many of the existing traditional approaches to robust control. Below two such cases are discussed in detail.

Norm-Bounded LDIs.

In this setting, it is assumed that the dynamics are of the form $$\dot{x}(t) = Ax(t) + Bu(t) + Gw(t), \qquad (6)$$

where A, B, and G are time-invariant, and the disturbance term w(t) is arbitrary but known to obey certain norm-boundedness conditions, namely that $$\|w(t)\|_2 \leq \|Cx(t) + Du(t)\|_2, \qquad (7)$$

for some (again, time-invariant) matrices $C \in \mathbb{R}^{k \times s}$, $D \in \mathbb{R}^{k \times a}$. For the purposes of the controller, it will be useful to additionally distinguish the special case where D=0.

Assuming a time-invariant linear control policy u(t)=Kx(t), one can formulate a specification of the set of policies that will stabilize the system under any worst-case perturbation in this class, via a set of linear matrix inequalities. At a high level, these methods will produce a controller gain K as well as a quadratic Lyapunov function $V(x) = x^T P x$ such that the Lyapunov function guarantees exponential stability of the resulting system under any disturbance that obeys the norm bound (7), where exponential stability is defined via the condition $$\dot{V}(x(t)) \leq -\alpha V(x(t)) \qquad (8)$$

for some design parameter $\alpha > 0$.

It can be derived mathematically that if one can find matrices $S \in \mathbb{S}^{s \times s} > 0$, $\mu \in \mathbb{R} > 0$, and $Y \in \mathbb{R}^{a \times s}$ that satisfy the linear matrix inequality $$\begin{bmatrix} AS + SA^T + \mu GG^T + BY + Y^T B^T & SC^T + Y^T D^T + \alpha S \\ CS + DY & -\mu I \end{bmatrix} \preceq 0 \qquad (9)$$

then $K = YS^{-1}$ and $P = S^{-1}$ are a stabilizing linear controller gain and quadratic Lyapunov function, respectively, that guarantee exponential stability of the NLDI (6)-(7). The above equation provides a convex set $\mathcal{C}_l$ of stabilizing linear controllers that can then be used within optimization problem (4) to design controllers that additionally optimize the LQR objective. For this domain one can additionally optimize over $\mu > 0$.

Polytopic LDIs.

Another setting of interest is that of polytopic LDIs (PLDIs). Here, the dynamics take the form $$\dot{x}(t) = A(t)x(t) + B(t)u(t), \qquad (10)$$

where A(t) and B(t) are matrices that can vary arbitrarily over time, and must only obey the constraint that they lie in the convex hull of some set of points $$(A(t),B(t)) \in \text{Conv}\{(A_1,B_1),\ldots,(A_L,B_L)\}, \quad (11)$$

where $A_i \in \mathbb{R}^{s \times s}$, $B_i \in \mathbb{R}^{s \times a}$ for $i=1,\ldots,L$, and Conv denotes the convex hull.

Similar to the above, one can design a stabilizing linear controller $u(t)=Kx(t)$ and quadratic Lyapunov function $V(x)=x^T Px$ by solving a set of linear matrix inequalities over variables $S \in \mathbb{R}^{s \times s} > 0$ and $Y \in \mathbb{R}^{a \times s}$, specifically $$A_i S + B_i Y + SA_i^T + Y^T B_i^T + \alpha S \leq 0, \forall i=1,\ldots,L. \quad (12)$$

As before, the resulting controller and quadratic Lyapunov function are parameterized by $K=YS^{-1}$ and $P=S^{-1}$. The above equation again provides a convex set $\mathcal{C}_l$ of stabilizing linear controllers that can be used in, e.g., Equation (4).

Nonlinear control policies, potentially parameterized by deep neural networks, can be obtained that are guaranteed to obey the same stability conditions enforced by the robust specifications as exemplified above. Although it is difficult to write conditions that globally characterize the stability of a nonlinear controller in general, one can create a sufficient condition for stability, e.g., by ensuring that a stability criterion holds, e.g., that a given policy decreases a Lyapunov function given a robustness specification.

The output of a nominal nonlinear controller $\hat{\pi}:\mathbb{R}^s \to \mathbb{R}^a$, e.g., the raw control signal produced by a neural network in response to a sensor signal, can be projected into the space of control actions that are provably stabilizing, e.g., under a given Lyapunov function and robustness specification. Since the details of this projection will vary depending on the type of robustness specification, a number of example projection are given for different settings. For simplicity of notation, the t-dependence of x and u are suppressed but note that these are still continuous-time quantities as before.

Stability in NLDIs

To ensure exponential stability for NLDIs, one can ensure that a control policy satisfies sufficient decrease of a given Lyapunov function $\dot{V}(x) \leq -\alpha V(x)$ for any perturbation that lies within the allowable set (7). Given such a Lyapunov function, which can be obtained as described above, one can derive a convex set of nonlinear control policies $\mathcal{C}_{NLDI}(P, \alpha, x)$ that satisfy this criterion. For example, one can derive mathematically that for the NLDI system (6)-(7), a stability parameter $\alpha > 0$, and a Lyapunov function $V(x)=x^T Px$ with P satisfying (9), one can define $\mathcal{C}_{NLDI}(P, \alpha, x)$ as the set of control actions $\pi(x) \in \mathbb{R}^a$ that, for a given state $x \in \mathbb{R}^s$, satisfy $$\|Cx + D\pi(x)\|_2 \leq \frac{-x^T PB}{\|G^T Px\|_2} \pi(x) - \frac{x^T(2PA + \alpha P)x}{2\|G^T Px\|_2}.$$

Thus $\mathcal{C}_{NLDI}(P, \alpha, x)$ is a non-empty set of controllers that satisfy the sufficient decrease criterion $\dot{V}(x) \leq -\alpha V(x)$. Further, as the above inequality represents a second-order cone constraint, $\mathcal{C}_{NLDI}(P, \alpha)$ is a convex set in $\pi(x)$. Having defined $\mathcal{C}_{NLDI}(P, \alpha, x)$, one can obtain the projection function P by solving problem (4) under the constraints (9) for a given value of $\alpha > 0$. For any particular x, one thus obtains a stabilizing policy $\pi(x)$ via projection of the nominal policy $\hat{\pi}(x)$ as $$\pi(x) = \mathcal{C}_{u \in \mathcal{P}_{NLDI(P,\alpha,x)}}(\hat{\pi}(x)). \quad (13)$$

This projection can then be used in the loop of neural network optimization (2), i.e., with $\mathcal{C}_n = \mathcal{C}_{NLDI}(P, \alpha, x)$. This projection does not necessarily have a closed form, but it can be implemented via optimization, using a differentiable convex optimization layer, e.g., from the convex optimization library CVXPY, see, e.g., 'Differentiable Convex Optimization Layers', by A. Agrawal, B. Amos, S. Barratt, S. Boyd, S. Diamond, and J. Zico Kolter.

Stability in NLDIs with D=0

A special case of the above problem is the case where D=0, i.e., where the norm bound on the disturbance w has no dependence on the control policy. This form of NLDI arises in many common settings, such as those where w characterizes linearization error but the original dynamics depend only linearly on the controller. In this case, the projection of the nominal policy onto the set of stabilizing controllers can be derived in closed form. Below the form of this set $\mathcal{C}_{NLDI-0}(P, \alpha, x)$ of stabilizing controllers is first presented. In this case, one can define $\mathcal{C}_{NLDI-0}(P, \alpha, x)$ as the set of control actions $\pi(x) \in \mathbb{R}^a$ that, for a given state $x \in \mathbb{R}^s$, that satisfy $$2x^T PB\pi(x) \leq -\alpha x^T Px - 2\|G^T Px\|_2 \|Cx\|_2 - 2x^T PAx.$$

The above inequality represents a linear constraint, so that $\mathcal{C}_{NLDI-0}(P, \alpha)$ is a convex set in $\pi(x)$.

Interestingly, one can obtain the projection P by solving optimization problem (4) under the constraints (9) for a given value of $\alpha > 0$, and then project $\hat{\pi}(x)$ onto the corresponding constraint set. In this particular case, the projection has a closed form, and may be implemented via a single ReLU operation. Specifically, defining $\rho^T \equiv 2x^T PB$ and $\eta \equiv -\alpha x^T Px - 2 - 2\|G^T Px\|_2 \|Cx\|_2 31\ 2x^T PAx$, one obtains that $$\pi(x) = \mathcal{P}_{u \in \mathcal{C}_{NLDI-0}(P,\alpha,x)}(\hat{\pi}(x)) \quad (14)$$

$$= \begin{cases} \hat{\pi}(x) & \text{if } \rho^T \hat{\pi}(x) \leq \eta, \\ \hat{\pi}(x) - \dfrac{\rho^T \hat{\pi}(x) - \eta}{\rho^T \rho}\rho & \text{otherwise} \end{cases}$$

$$= \hat{\pi}(x) - \text{ReLU}\left(\frac{\rho^T \hat{\pi}(x) - \eta}{\rho^T \rho}\right)\rho.$$

As before, this projection can then be used within the neural network optimization (2), i.e., with $\mathcal{C}_n = \mathcal{C}_{NLDI-0}(P, \alpha, x)$.

Stability in PLDIs

To ensure exponential stability for PLDIs, one may similarly ensure that the control policy sufficiently decreases the Lyapunov function $\dot{V}(x) \leq -\alpha V(x)$ for any $(A(t), B(t))$ in the allowable set (11). A convex set of nonlinear control policies $\mathcal{C}_{PLDI}(P, \alpha, x)$ that satisfy this criterion can be derived. For example, consider the PLDI system (10)-(11), a stability parameter $\alpha > 0$, and a Lyapunov function $V(x)=x^T Px$ with P satisfying (12). Define $\mathcal{C}_{PLDI}(P, \alpha, x)$ as the set of control actions $\pi(x) \in \mathbb{R}^a$ that, for a given state $x \in \mathbb{R}^s$, satisfy $$\begin{bmatrix} 2x^T PB_1 \\ 2x^T PB_2 \\ \vdots \\ 2x^T PB_L \end{bmatrix} \pi(x) \leq -\begin{bmatrix} x^T(\alpha P + 2PA_1)x \\ x^T(\alpha P + 2PA_2)x \\ \vdots \\ x^T(\alpha P + 2PA_L)x \end{bmatrix}.$$

$\mathcal{C}_{PLDI}(P, \alpha, x)$ is a non-empty set of controllers that satisfy the sufficient decrease criterion $\dot{V}(x) \leq -\alpha V(x)$. Further, as the above inequality represents a linear constraint, $\mathcal{C}_{PLDI}(P, \alpha, x)$ is a convex set in $\pi(x)$.

Below two detailed example embodiments are described, showing improved stability under even adversarial disturbances: a cart-pole task, and a quadrotor domain.

Cart-Pole.

In the cart-pole task, the goal is to balance an inverted pendulum that is resting atop a cart. The state of this system may be defined as $x=[p_x, \dot{p}_x, \varphi, \dot{\varphi}]^T$, where $p_x$ is the cart position and $\varphi$ is the angular displacement of the pendulum from its vertical position. One seeks to stabilize the system at $x=\vec{0}$ by exerting horizontal forces $u \in \mathbb{R}$ on the cart. For a pendulum of length $\ell$ and mass $m_p$, and for a cart of mass $m_c$, the dynamics of the system are given by:

$$\dot{x} = \begin{bmatrix} \dot{p}_x \\ \dfrac{u + m_p \sin\varphi(\ell\dot{\varphi}^2 - g\cos\varphi)}{m_c + m_p \sin^2\varphi} \\ \dot{\varphi} \\ \dfrac{(m_c + m_p)g\sin\varphi - u\cos\varphi - m_p\ell\dot{\varphi}^2\cos\varphi\sin\varphi}{l(m_c + m_p\sin^2\varphi)} \end{bmatrix}, \quad (18)$$

where $g=9.81$ m/s$^2$ is the acceleration due to gravity. This system may be written as an NLDI by defining $\dot{x}=f(x, u)$ and then linearizing the system about its equilibrium point as $$\dot{x} = \nabla f(0, 0)\begin{bmatrix} x \\ u \end{bmatrix} + w, \quad \|w\| \leq \|Cx + Du\|, \quad (19)$$

where $w=f(x, u)-\nabla f(0,0)\,[x\ u]^T$ is the linearization error. This linearization error may be bounded by numerically obtaining the matrices C and D, assuming that x and u are within a neighborhood of the origin. In this case the dynamic system is defined as an NLDI, as NLDI formulation yields a much smaller problem description. However, it is also possible to use polytopic uncertainty. For the LQR objective matrices Q and R were randomly generated.

Planar Quadrotor.

In the planar quadrotor setting, the goal is to stabilize a quadcopter in the two-dimensional plane. The state of this system may be defined as $x=[p_x, p_z, \varphi, \dot{p}_x, \dot{p}_z, \dot{\varphi}]^T$, where $(p_x, p_z)$ is the position of the quadcopter in the vertical plane and $\varphi$ is its roll (i.e., angle from the horizontal position). One seeks to stabilize the system at $x=\vec{0}$ by controlling the amount of force $u=[u_r, u_l]^T$ provided by the right and left thrusters of the quadcopter. It is assumed that the action u is additional to a baseline force of $[mg/2\ mg/2]^T$ provided by the thrusters by default to prevent the quadcopter from falling. For a quadrotor with mass m, moment-arm $\ell$ for the thrusters, and moment of inertia J about the roll axis, the dynamics of this system are given by:

$$\dot{x} = \begin{bmatrix} \dot{p}_x\cos\varphi - \dot{p}_z\sin\varphi \\ \dot{p}_x\sin\varphi - \dot{p}_z\cos\varphi \\ \dot{\varphi} \\ \dot{p}_z\dot{\varphi} - g\sin\varphi \\ -\dot{p}_x\dot{\varphi} - g\cos\varphi + g \\ 0 \end{bmatrix} + \begin{bmatrix} 0 & 0 \\ 0 & 0 \\ 0 & 0 \\ 0 & 0 \\ 1/m & 1/m \\ \ell/J & -\ell/J \end{bmatrix} u, \quad (20)$$

where $g=9.81$ m/s$^2$. The system may be linearized via a similar method as for the cart-pole setting, e.g., as in Equation (19). The dependence of the dynamics on u is linear, so that one has D=0 for the resultant NLDI. As in the previous settings, one may randomly generate the LQR objective matrices Q and R, e.g., by sampling each entry of each matrix i.i.d. from the standard normal distribution.

In both the cart pole and the quadrotor example, a nominal nonlinear control policy may be constructed as $\hat{\pi}_\theta(x)=Kx+\tilde{\pi}_\theta(x)$, with K obtained via robust LQR optimization and where $\tilde{\pi}_\theta(x)$ is a neural network. To construct the relevant projection, one may employ the value of P obtained when solving for K. In the cases where $D \neq 0$ (e.g., for the cart-pole example), the projection (13) may be implemented using a differentiable optimization layer. Where D=0, e.g, for quadrotor, the projection (14) may be implemented via a ReLU. A robust policy is trained $\pi_\theta(x) = \mathcal{P}_\mathcal{C}(\hat{\pi}_\theta(x))$ via direct policy search, where each epoch comprises a horizon of 1 second at a discretization of 0.005 seconds, and where the network was trained until performance on a hold-out set did not improve for 100 epochs. Although direct policy search was used in this embodiment, the general approach is agnostic to the particular method of training and can be deployed with other deep reinforcement learning paradigms.

The robust neural network-based method is compared against a robust (linear) LQR controller, a non-robust neural network trained via direct policy search, and a standard non-robust (linear) LQR controller. Performance is evaluated both in the original setting (e.g., under the original dynamics), and also under a test-time disturbance w(t) generated adversarially to minimize the decrease in the Lyapunov function (see Appendix 7). All methods are evaluated over a horizon of 1 second, at a discretization of 0.005 seconds.

Table 1 shows the performance of these methods on the domains of interest. Reported is the integral of the quadratic loss over the prescribed time horizon on a test set of states, or mark an "X" to indicate cases where the relevant method became unstable (and thus the loss became inf, NaN, or many orders of magnitude larger than for other approaches). These results illustrate the basic advantage of the robust NN approach. In all cases, the performance of the robust NN on the original dynamics (which is the objective which was optimized) improves over that of the robust LQR approach (e.g., the linear controller that also provides stability guarantees). At the same time, the traditional (non-robust) LQR method and the non-robust NN, as expected, often perform better within the original nominal dynamics as they were optimizing for expected, rather than worst-case, performance). Original nominal dynamics is indicated with O; adversarial dynamics with A.

| Environment | | LQR | Robust LQR | NN | Robust NN |
| --- | --- | --- | --- | --- | --- |
| Generic, D = 0 | O | 231.55 | 761.629 | 73.43 | 673.16 |
| | A | X | 753.37 | 4472.75 | 1250.34 |
| Generic, D ≠ 0 | O | 141.51 | 15940.81 | 74.56 | 14618.81 |
| | A | X | 17000.20 | X | 120326.29 |
| Cart Pole | O | 2.12 | 2.52 | 1.45 | 2.45 |
| | A | 2.18 | 3.55 | 7.57 | 3.50 |
| Quadrotor | O | 60.26 | 59.17 | 48.56 | 56.13 |
| | A | 231.55 | 761.629 | 73.43 | 673.16 |

Notably, however, when adversarial perturbations were applied, which still lie within the allowable norm bounds and are thus valid perturbations, the non-robust LQR and neural network approaches can diverge or perform very poorly. In contrast, both the robust neural network and the robust LQR approaches remain stable even under these perturbations.

The robust and non-robust NN approaches both converge fairly quickly to their final performance levels. The non-robust NN frequently becomes unstable under the adversarial dynamics very early in the process. Overall, these results show that embodiments are able to learn policies that are more expressive than traditional robust LQR, while guaranteeing these policies will be stable.

Figure 5:
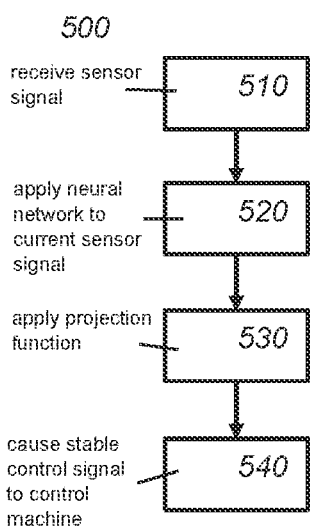
FIG. 5 schematically shows an example of an embodiment of a controlling method for generating a control signal for a computer-controlled machine, in accordance with the present invention.

FIG. 5 schematically shows an example of an embodiment of a controlling method (500) for generating a control signal for a computer-controlled machine. Method 500 may be computer implemented. The computer-controlled machine comprising multiple parts interacting in a dynamical system. The controlling method may comprise

- receiving (510) a sensor signal from a sensor system sensing the computer-controlled machine, the sensor signal indicating a current state of the computer-controlled machine
- applying (520) a neural network to the current sensor signal, the neural network defining a raw control policy for the computer-controlled machine, the neural network being configured to map the sensor signal to a raw control signal,
- applying (530) a projection function to the raw control signal to obtain a stable control signal, the projection function mapping a raw control policy space to a stable control policy space of predefined stable control policies,
- causing (540) the stable control signal to control the computer-controllable machine.

Figure 6:
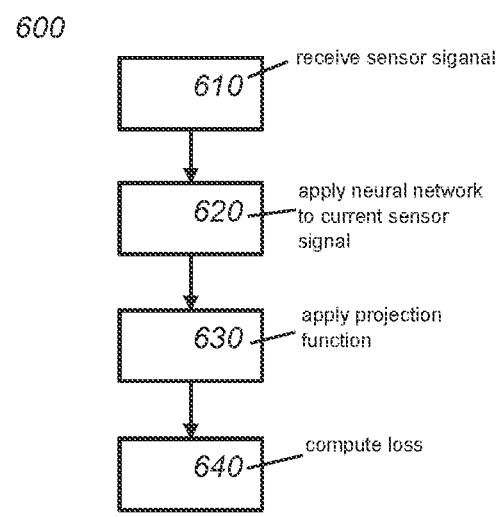
FIG. 6 schematically shows an example of an embodiment of a training method for training a neural network for use in controlling a computer-controlled machine, in accordance with the present invention.

FIG. 6 schematically shows an example of an embodiment of a training method (600) for training a neural network for use in controlling a computer-controlled machine. The computer-controlled machine comprising multiple parts interacting in a dynamical system. Method 600 may be computer implemented. The training method may comprise

- receiving (610) a sensor signal representative for a sensor system sensing the computer-controlled machine, the sensor signal indicating a current state of the computer-controlled machine,
- applying (620) a neural network to the current sensor signal, the neural network defining a raw control policy for the computer-controlled machine, the neural network being configured to map the sensor signal to a raw control signal,
- applying (630) a projection function to the raw control signal to obtain a stable control signal, the projection function mapping a raw control policy space to a stable control policy space of predefined stable control policies,
- compute (640) a loss for the stable control signal and train parameters of the neural network to reduce the loss.

For example, the controlling and training method may be computer implemented methods. For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc., e.g., parameters of the networks. For example, applying a neural network to data of the training data, and/or adjusting the stored parameters to train the network may be done using an electronic computing device, e.g., a computer.

The neural network, either during training and/or during applying, may have multiple layers, which may include, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500 and/or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
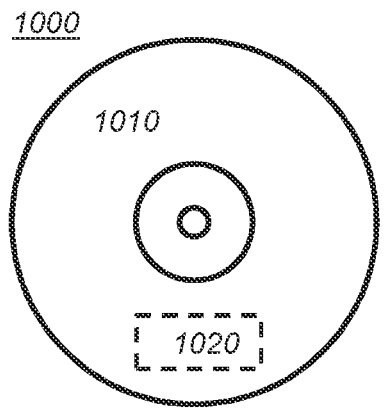
FIG. 7a schematically shows a computer readable medium having a writable part comprising a computer program according to an embodiment, in accordance with the present invention.

FIG. 7a shows a computer readable medium 1000 having a writable part 1010 comprising a computer program 1020, the computer program 1020 comprising instructions for causing a processor system to perform a controlling and/or training method according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a controlling and/or training method.

Figure 7B:
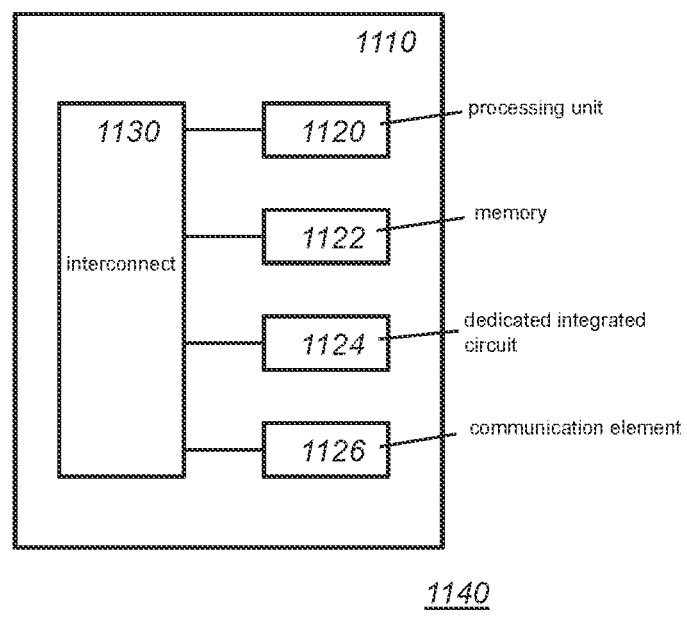
FIG. 7b schematically shows a representation of a processor system according to an embodiment, in accordance with the present invention.

FIG. 7b shows in a schematic representation of a processor system 1140 according to an embodiment of a controller and/or training system or device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the controller and/or training system/device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

A processor system may include multiple microprocessors that are configured to independently execute the methods described herein or are configured to perform steps or subroutines of the methods described herein such that the multiple processors cooperate to achieve the functionality described herein. Further, where the device and/or system is implemented in a cloud computing system, the various hardware components may belong to separate machines. For example, the processor may include a first processor in a first server and a second processor in a second server.

It should be noted that the above-mentioned embodiments illustrate rather than limit the present invention, and that those skilled in the art will be able to design many alternative embodiments in view of the disclosure herein.

Use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The present invention may be implemented by hardware comprising several distinct elements, and by a suitably programmed computer. In the device claim enumerating several parts, several of these parts may be embodied by one and the same item of hardware. The mere fact that certain measures are described separately does not indicate that a combination of these measures cannot be used to advantage.

What is claimed is:

1. A controller for generating a control signal for a computer-controlled machine, the computer-controlled machine including multiple interacting parts, the controller comprising:

a sensor input interface configured to receive a sensor signal from a sensor system which senses the computer-controlled machine, the sensor signal indicating a current state of the computer-controlled machine;

a neural network storage configured for storing a trained neural network, the trained neural network defining a raw control policy for the computer-controlled machine; and a processor system configured to:

apply the trained neural network to a current sensor signal, the trained neural network being configured to map the current sensor signal to a raw control signal, apply a projection function to the raw control signal to obtain a stable control signal, the projection function mapping a raw control policy space to a stable control policy space of predefined stable control policies, and control, using the stable control signal, the computer-controlled machine to change the computer-controlled machine to a desired physical state, wherein the control includes controlling an actuator of the computer-controlled machine to move at least a part of the computer-controlled machine to a different position;

wherein the projection function is defined as $$\pi(x) = \mathcal{P}(\hat{\pi}(x))$$
$$= \begin{cases} \hat{\pi}(x) & \text{if } \rho^T \hat{\pi}(x) \leq \eta, \\ \hat{\pi}(x) - \dfrac{\rho^T \hat{\pi}(x) - \eta}{\rho^T \rho} \rho & \text{otherwise} \end{cases}$$

for sensor input x, stable control signal $\pi(x)$, raw control signal $\hat{\pi}(x)$, vector $\rho$ and value $\eta$.

2. The controller as recited in claim 1, wherein the trained neural network is repeatedly applied to the current sensor signal obtained from the sensor system to repeatedly obtain other stable control signals for controlling the computer-controlled machine.

3. The controller as recited in claim 1, wherein the sensor system includes at least one of an image sensor, a radar, a lidar, and/or a pressure sensor.

4. The controller as recited in claim 1, wherein the trained neural network is further configured to receive as input a goal state; and control the computer-controlled machine to reach the goal state.

5. The controller as recited in claim 1, wherein the multiple interacting parts are interacting according to a dynamical system.

6. The controller as recited in claim 1, wherein the computer-controlled machine includes at least one of a robot, a vehicle, a domestic appliance, a power tool, a manufacturing machine, and/or a drone.

7. The controller as recited in claim 1, wherein the stable control policy space is defined by a stability equation.

8. The controller as recited in claim 1, wherein the raw control signal and the stable control signal are represented as vectors, wherein elements of the vector represent the stable control signal that is an input for the computer-controlled machine.

9. A controlling method for generating a control signal for a computer-controlled machine, the computer-controlled machine including multiple parts interacting in a dynamical system, the controlling method comprising:
receiving a sensor signal from a sensor system sensing the computer-controlled machine, the sensor signal indicating a current state of the computer-controlled machine;
applying a neural network to a current sensor signal, the neural network defining a raw control policy for the computer-controlled machine, the neural network being configured to map the current sensor signal to a raw control signal;
applying a projection function to the raw control signal to obtain a stable control signal, the projection function mapping a raw control policy space to a stable control policy space of predefined stable control policies; and
controlling, using the stable control signal, the computer-controlled machine to move the computer-controlled machine to a desired physical state, wherein the controlling includes controlling an actuator of the computer-controlled machine to move at least a part of the computer-controlled machine to a different position;
wherein the projection function is defined as $$\pi(x) = \mathcal{P}(\hat{\pi}(x))$$
$$= \begin{cases} \hat{\pi}(x) & \text{if } \rho^T \hat{\pi}(x) \le \eta, \\ \hat{\pi}(x) - \dfrac{\rho^T \hat{\pi}(x) - \eta}{\rho^T \rho} \rho & \text{otherwise} \end{cases}$$

for sensor input x, stable control signal π(x), raw control signal $\hat{\pi}$(x), vector ρ and value η.

10. A non-transitory computer readable medium comprising stored instructions that generate a control signal for a computer-controlled machine that includes multiple parts interacting in a dynamical system, the instructions, when executed by a processor system, cause the processor system to perform:
receiving a sensor signal from a sensor system sensing the computer-controlled machine, the sensor signal indicating a current state of the computer-controlled machine;
applying a neural network to a current sensor signal, the neural network defining a raw control policy for the computer-controlled machine, the neural network being configured to map the current sensor signal to a raw control signal;
applying a projection function to the raw control signal to obtain a stable control signal, the projection function mapping a raw control policy space to a stable control policy space of predefined stable control policies; and
controlling, using the stable control signal, the computer-controlled machine the computer-controlled machine to a desired physical state, wherein the controlling includes controlling an actuator of the computer-controlled machine to move at least a part of the computer-controlled machine to a different position;
wherein the projection function is defined as $$\pi(x) = \mathcal{P}(\hat{\pi}(x))$$
$$= \begin{cases} \hat{\pi}(x) & \text{if } \rho^T \hat{\pi}(x) \le \eta, \\ \hat{\pi}(x) - \dfrac{\rho^T \hat{\pi}(x) - \eta}{\rho^T \rho} \rho & \text{otherwise} \end{cases}$$

for sensor input x, stable control signal π(x), raw control signal $\hat{\pi}$(x), vector ρ and value η.

11. The controller as recited in claim 1, wherein the controlling includes moving at least part of the computer-controlled machine along a determined trajectory.

12. The controlling as recited in claim 1, wherein the controlling includes applying a determined force to at least at part of the computer controlled machine.

* * * * *